Patented Oct. 3, 1922.

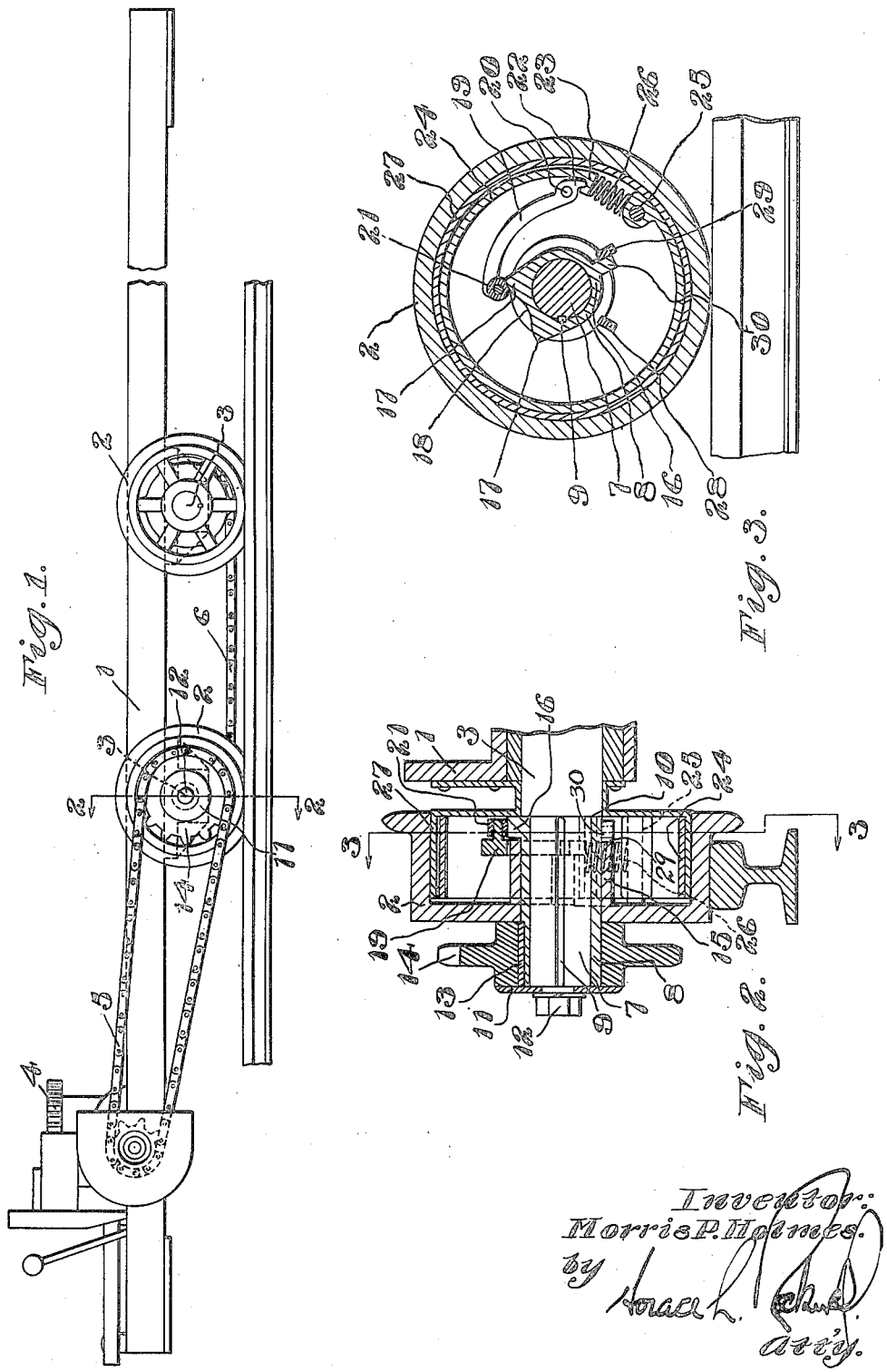

1,431,115

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

BRAKE.

Application filed March 5, 1918. Serial No. 220,804.

*To all whom it may concern:*

Be it known that I, MORRIS P. HOLMES, a citizen of the United States, residing at Claremont, in the county of Sullivan and State of New Hampshire, have invented certain new and useful Improvements in Brakes, of which the following is a full, clear, and exact specification.

My invention relates to brakes. It has for its object to provide an improved braking mechanism operative automatically to apply the brake to a rotating element when for any reason the transmission of power thereto is interrupted. A further object of my invention is to provide improved mechanism especially adapted to use in connection with trucks wherein the braking mechanism is housed compactly within one of the truck wheels in such a fashion as to be protected, and comprises improved means adapted to brake the truck wheel when for any reason the truck driving mechanism is rendered inoperative. These and other objects and advantages of my improved construction will, however, hereinafter more fully appear.

In the accompanying drawings, I have shown for purposes of illustration one embodiment which my invention may assume in practice.

In these drawings,—

Fig. 1 is a side elevation of a truck equipped with my improvement.

Fig. 2 is a partial longitudinal sectional view taken on line 2—2 of Fig. 1.

Fig. 3 is a detail transverse sectional view taken on line 3—3 of Fig. 2.

In this illustrative construction, I have shown my improvement applied to a mining machine truck of standard design and including a usual machine carrying and guiding frame 1 mounted on a plurality of pairs of track wheels 2, which wheels are in turn carried upon live axles 3 and connected to a truck driving member 4 rotatable in a well known manner by the mining machine through power transmission mechanism including a chain drive 5 connected to one end of the rear axle 3 and a cooperating chain drive 6 connected between the opposite ends of the rear and front axles.

In my improvement, means are provided which are housed within one or more of the wheels 2 and are adapted automatically to brake the truck when one of the driving connections is broken or disconnected for any reason. As shown, this mechanism is illustrated as applied to one of the rear wheels, although it may obviously be applied to any one of the wheels, as will hereinafter be more fully brought out. Referring to the specific illustration of the mechanism shown in Figs. 2 and 3, it will be noted that the rear axle 3 is preferably provided with a reduced end 7 on which a sleeve member 8 is splined at 9. This sleeve member 8, as shown, preferably extends between a suitable shoulder 10 on the axle member and the end of that member, being held in position on the latter in a well known manner, as by a washer 11 and a clamping bolt, herein shown at 12, and preferably threaded in the end of the axle. As illustrated, this sleeve has splined thereto at 13 at its outer end, a suitable sprocket 14 forming a part of the chain drive 5, and also acts as a journal for the wheel 2, the latter being provided with an inwardly extending bearing flange 15. Disposed adjacent the inner edge of this flange 15, is a cam 16, formed on the sleeve 8 and rotatable therewith and with the shaft 3, which cam, as shown, is preferably provided with a working face comprising a plurality of projections 17 spaced apart by a trough or depression 18. It will also be noted that the working face of this cam is engaged by a brake actuating member 19 pivoted at 20 at a point near one of its ends to the inside of the wheel 2, and provided with an offset roller 21 on the end of its long arm, adapted to engage the surface of the cam 16, and a hook portion 22 on the end of its short arm, adapted to engage the end 23 of a brake band 24 which is likewise pivoted at one end at 25 on the inside of the wheel and is normally expanded by a spring 26 acting between its ends, in such a manner as to force the member 24 into engagement with a fixed annular cooperating brake member 27 extending into the wheel 2 and preferably carried by the frame 1. As shown, it will also be observed that a plurality of spaced lugs 28 and 29 cast or otherwise secured on the wheel 2 is provided and that these are adapted to be engaged by a lug 30 on the cam member 16 when the shaft 3 is rotated in either direction.

In the operation of my improved construction, it will be observed that when power is transmitted through the chain drive 5, the sprocket 14 and sleeve 8 are rotated to the position shown in Fig. 3, in such a manner as to cause the roller 21 on the member 19 to be elevated on one of the projections 17 on the cam 16 and thereby swing the long arm of the member 19 about its pivot 20 and cause the short arm thereof to compress the brake band against the action of the spring 26 and thus free the band from the member 27 so that the truck may be propelled as desired through the action of the lug 30 against the lug 29. If, however, the power transmitted through the chain drive 5 is interrupted, as, for instance, by the breakage or disconnection of the chain, it will be observed that the shaft 3 will then be turned to the right from the position shown in Fig. 3 so that the roller 21 will seat in the trough 18 of the cam 16 and thus release the pressure tending to draw in the brake band, and enable the spring 26 to expand the brake band and bring it into braking contact with the inner periphery of the cooperating brake member 27 carried on the frame 1. In other words, it will be observed that the mechanism herein described permits the truck to be driven in the usual manner, and that it functions only when the transmission of power to the shaft 3 is interrupted, the same then acting automatically to apply the brake to the wheel. It should be observed, moreover, that this mechanism acts as an automatic speed limiting device on grades, for as soon as the speed of the truck due to gravity is in excess of the speed due to the motor drive the wheel will gain, so to speak, on the cam, and the brakes will be applied.

Obviously, in the use of my improved construction, the mechanism may be appiled to more than one wheel of the truck by simply equipping the other wheels with similar braking mechanism. For instance, by equipping both rear wheels with the mechanism described, both rear wheels may be braked when the connection 5 is broken, and by equipped both front wheels with this mechanism, those wheels may be braked when either of the connections 5 or 6 is broken. In each instance, it will be noted that it will be only necessary to apply a braking mechanism such as above described to each of the wheels which it is desired to have act as a brake wheel, the other connections comprising the chains 5 and 6 remaining as before.

By the use of my improved construction, it will be observed that it is possible to control the movement of the truck automatically in such a manner as to prevent the running away of the truck upon rupture of the driving connections or when the same for any reason become disconnected. It will also be observed that these means are housed within the wheels so that they are fully protected against dirt, damage, or accidental application in the normal use of the machine. Attention is also directed to the fact that the braking means themselves are of a simple and rugged construction which is readily adapted to withstand long use in service.

While I have in this application specifically described one embodiment which my invention may assume in practice, it will be understood that this form of the same is chosen for purposes of illustration and that the invention may be modified and embodied in various other forms without departing from its spirit or the scope of the appended claims.

What I claim as new and desire to secure by Letters Patent is:

1. In a truck driving mechanism, a truck frame including a plurality of rotatable truck supporting members, and means coaxial with one of said members and operative when in different relative positions with respect thereto to respectively drive and effect braking thereof.

2. In a truck driving mechanism, a truck frame including a plurality of rotatable truck driving and supporting members, and means coacting with one of the same having a limited range of angular movement with respect thereto and operative when in one limit position to drive said member and when in another position to effect braking of said member.

3. In a truck driving mechanism, a rotatable truck driving and supporting member, and means coacting therewith having a limited range of movement with respect thereto, said means being operative when in its opposite limit positions to drive said truck driving member in opposite directions and when in an intermediate position, to effect braking thereof.

4. In a device of the class described, a frame, a power driven member mounted thereon, a rotatable driving and supporting member for said frame, means constituting an operative driving connection between said power driven member and said second mentioned member including a member directly driven by said power driven member and having a lost motion connection with said second mentioned member, braking means for said second mentioned member, and means operative when said lost motion is taken up to connect said third and second mentioned members for positive driving of the latter by the former and to render said braking mechanism inoperative, said braking means being automatically operative in other relations of said second and third mentioned members.

5. In a truck driving mechanism, a rotatable truck driving and supporting member, braking means movable therewith, driving means movable therewith, and a member operative when in different positions to engage with said means to effect braking or driving of said rotatable truck driving member.

6. In a truck braking mechanism, a rotatable supporting member, braking means, and driving means disposed in said rotatable supporting member including a member operative in one position to effect positive drive of the rotatable supporting member, and upon interruption of the driving action, to assume a different position and to cause co-action of said braking member with said supporting member.

7. In a truck braking mechanism, a wheeled truck frame, a wheel therefor, driving means for said wheel, and means disposed within said wheel for automatically braking the same upon interruption of the driving thereof.

8. In a truck braking mechanism, a wheel, stationary braking means therein, driving means, and cooperating braking means automatically operative upon disconnection of said driving means.

9. In a truck braking mechanism, a truck frame, a rotatable member thereon, and braking means disposed in said member automatically engageable with said frame upon interruption of the driving of said member.

10. The combination with a truck driving mechanism having a truck supporting wheel and driving means therefor, of an automatic braking mechanism in said wheel for braking a movement of the truck upon an interruption of the driving action.

11. In an apparatus of the class described, a casing comprising a driven member and a fixed member, and means in said casing for braking said driven member and comprising a brake band and mechanism for controlling said band.

12. In an apparatus of the class described, a casing comprising a driven member and a fixed member, a driving member, and means in said casing for braking said driven member and comprising a brake band and mechanism for holding said band in an inoperative position while said driving member is being operated to drive said driven member.

13. In a braking mechanism, a rotatable shaft, a sleeve fixed thereto and having a cam thereon, a rotatable member having a limited rotation relative to said sleeve, and braking mechanism disposed within said rotatable member and controlled by said cam.

14. In combination, a frame, a rotatable axle thereon, a sleeve on said axle, a cam on said sleeve, a driving member fixed to said sleeve, a rotatable member on said sleeve, a fixed braking member, cooperating normally operative braking means, and means actuated by said cam and rotatable with said rotatable member controlling said cooperating braking means.

15. In a mining machine truck, a truck frame, running gear therefor including a transverse axle and a wheel coaxial with said axle, braking means disposed on said truck in juxtaposition to said wheel, a driving sprocket coaxial with said wheel for driving the latter, flexible driving means for said driving sprocket constituting a driving connection between power means disposed on said truck and said sprocket, and means for connecting said sprocket with said wheel and for releasing said brake when said connection is made.

16. In a mining machine truck, a truck frame, running gear therefor including a truck driving wheel, a driving connection therefor, and automatic braking mechanism coaxial with said wheel for braking movement of the truck on interruption of the transmission of power through said driving connection.

17. In a mining machine truck, a rotatable truck supporting member, means cooperating therewith to cause the same to drive said truck, and braking means enclosed within said member and operative to effect braking of the latter upon interruption of the driving thereof, said braking member being rendered inoperative automatically on application of power to drive said truck.

18. In a mining machine truck, a truck frame, running gear therefor including at least one truck wheel, said truck wheel having an open-sided recess formed therein, a driving sprocket coaxial with said truck wheel, a braking element secured to said truck frame and comprising means for closing said recess, cooperating braking means carried by said truck wheel and disposed in said recess, and means for connecting said sprocket with said truck wheel and for applying and releasing said brake disposed in said recess.

19. In a mining machine truck, a truck frame, running gear therefor including at least one truck wheel, said truck wheel having an open-sided recess therein, a member secured to said truck frame closing said recess, and means in said recess for braking said truck wheel including a braking element and means for controlling the same.

20. In a mining machine truck, a truck frame, running gear therefor including at least one truck wheel, said truck wheel having an open-sided recess therein, a member secured to said truck frame closing said recess, and means in said recess for braking said truck wheel including cooperating braking members secured respectively to said wheel and to said member and means for controlling their cooperation.

21. In a mining machine truck, a truck frame, running gear therefor including at least one truck wheel, said truck wheel having an open-sided recess therein, a member secured to said truck frame closing said recess, a driving sprocket coaxially disposed with said wheel, and means in said recess for braking said truck wheel including cooperating braking members secured respectively to said wheel and to said member and means controlled by the relative angular position of said driving sprocket and wheel for controlling their cooperation.

22. In a mining machine truck, a truck frame, running gear therefor including an axle, a driving sprocket adjacent the end thereof, a truck driving wheel on said axle between said driving sprocket and said truck frame, and having a limited angular movement relative to said sprocket, said driving wheel having a recess therein open on the side adjacent said truck frame, a member secured to said truck frame and constituting a closure for the open side of said recess, cooperating braking elements secured respectively to said wheel and member, and means in said recess controlled by the relative angular position of said sprocket and wheel.

In testimony whereof I affix my signature.

MORRIS P. HOLMES.